United States Patent [19]
Brattoli

[11] Patent Number: 5,137,048
[45] Date of Patent: Aug. 11, 1992

[54] TUB/SHOWER DIVERTER VALVE
[75] Inventor: Michael A. Brattoli, Elyria, Ohio
[73] Assignee: Moen Incorporated, Elyria, Ohio
[21] Appl. No.: 707,027
[22] Filed: May 29, 1991
[51] Int. Cl.⁵ .......................................... F16K 11/085
[52] U.S. Cl. .................................... 137/269; 137/876
[58] Field of Search ..................... 137/876, 597, 269; 251/311

[56] References Cited
U.S. PATENT DOCUMENTS

| | | | |
|---|---|---|---|
| 1,024,908 | 4/1912 | Powelsen | 251/311 X |
| 3,406,705 | 10/1968 | Meyer | 251/311 X |
| 3,411,986 | 11/1968 | Buchberger et al. | 251/311 X |
| 3,906,997 | 9/1975 | Scaglione | 251/311 X |
| 4,997,007 | 3/1991 | Niemann et al. | 137/876 X |

Primary Examiner—Stephen M. Hepperle
Attorney, Agent, or Firm—Kinzer, Plyer, Dorn, McEachran & Jambor

[57] ABSTRACT

A tub/shower diverter assembly includes a housing and a diverter valve. The housing has a water inlet, a shower outlet and a tub outlet. The diverter valve is formed of two removably joined parts, a stem and a sleeve. The stem has a portion extending outwardly from the housing for operation of the diverter. The sleeve controls the flow of water through the diverter and has a hollow interior, spaced inlet ports and an outlet port which may be moved into alignment with either the housing tub outlet or the housing shower outlet. The sleeve may have variably sized interiors to accommodate different flow rates to meet different water codes.

9 Claims, 1 Drawing Sheet

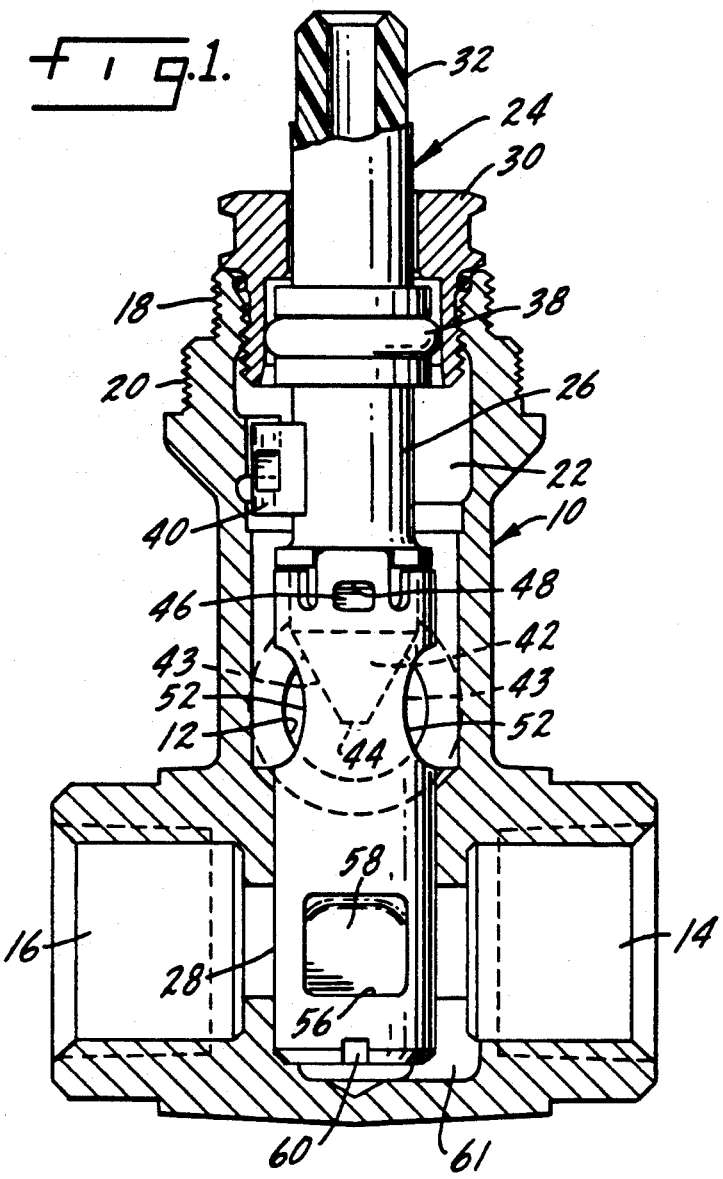
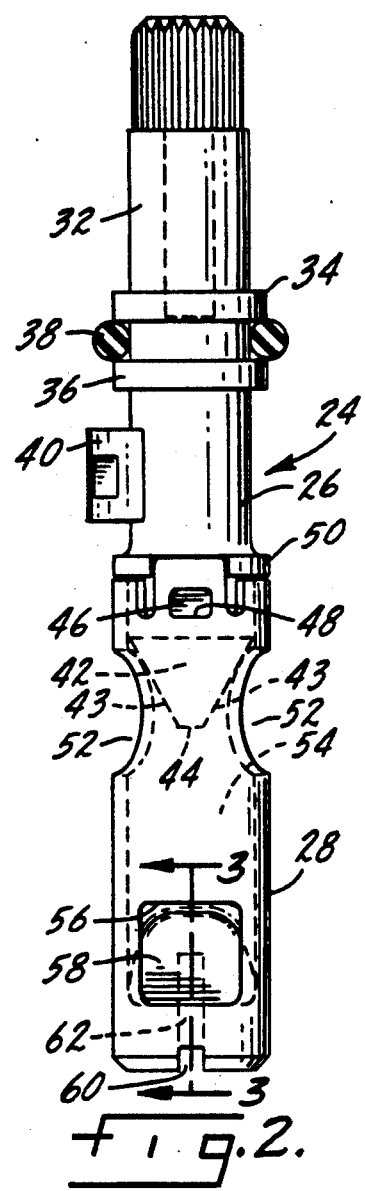
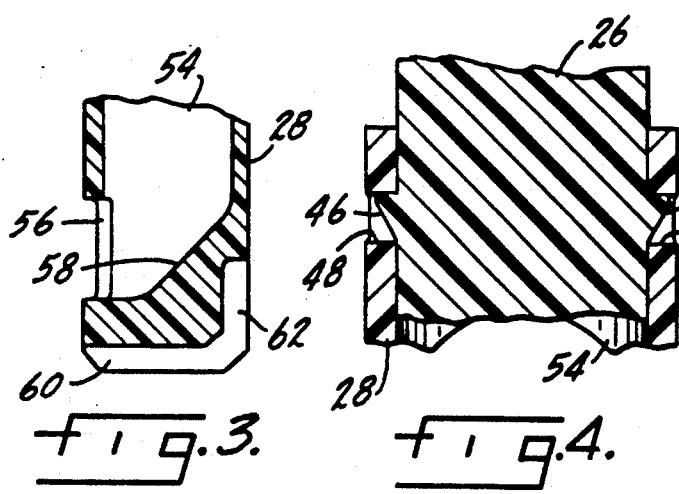
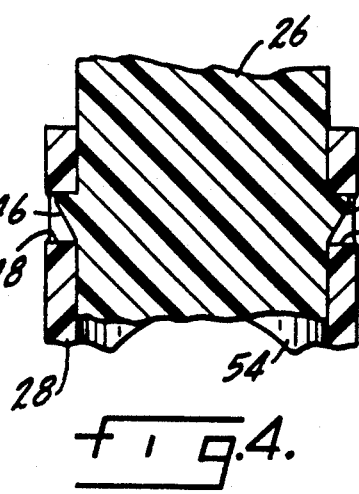
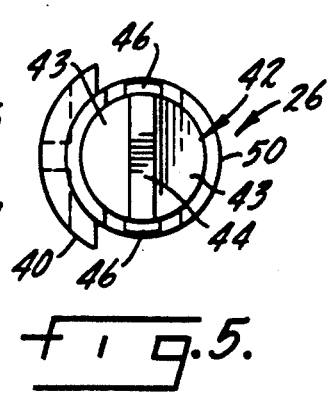

TUB/SHOWER DIVERTER VALVE

THE FIELD OF THE INVENTION

The present invention relates to tub/shower diverter assemblies commonly used to direct water either through the shower outlet or through the tub spout. In particular, the invention relates to such a unit in which the diverter valve is of a two-piece snap-fit construction. The sleeve portion of the diverter valve, which controls the volume of water flow, is replaceable so that the water flow to the shower and tub outlets can be adjusted to comply with local water codes. The diverter assembly also is unique in that it exhibits zero stacking, which is the tendency for water to back up into the shower outlet conduit during flow through the tub spout. The diverter valve functions in this manner because of a relatively high velocity of flow through the diverter valve and the tight fit of the valve within the diverter housing.

DESCRIPTION OF THE RELATED ART

Moen Incorporated of Elyria, Ohio, the assignee of the present application, presently utilizes a one-piece diverter valve in which water from the diverter housing inlet port is directed into a portion of the hollow interior of the diverter valve. The valve does not totally prevent stacking, nor does it provide for a variable rate of flow to satisfy all current water codes. The present invention overcomes the problems of the diverter valve currently used by Moen Incorporated by constructing the diverter valve out of two elements which are removably connected, one of the elements being solely responsible for the volume of water flow and this element being replaceable so that the diverter assembly may be utilized in areas having different water codes. U.S. Pat. No. 4,997,007 shows a shower diverter valve of the general type disclosed herein.

SUMMARY OF THE INVENTION

The present invention relates to tub/shower diverter valves and in particular to improvements in such valves which can accommodate different flow rates, depending upon the local water code.

Another purpose of the invention is an improved diverter assembly in which the assembly is formed of two snapfitted parts, with only one of the parts controlling water flow through the diverter valve.

Another purpose is a diverter assembly for the use described which prevents stacking, which is a tendency for water to flow upwardly through the shower conduit when the diverter is in the tub position.

Other purposes will appear in the ensuing specification, drawings and claims.

BRIEF DESCRIPTION OF THE DRAWINGS

The invention is illustrated diagrammatically in the following drawings wherein:

FIG. 1 is an axial section through the tub/shower diverter assembly of the present invention, FIG. 2 is a side view of the diverter valve, FIG. 3 is an enlarged partial section along plane 3—3 of FIG. 2, FIG. 4 is an enlarged partial axial section illustrating the interconnection between the two parts of the diverter valve, and FIG. 5 is a bottom view of the diverter valve stem.

DESCRIPTION OF THE PREFERRED EMBODIMENT

In the drawings, the tub/shower diverter assembly includes a housing 10 having a water inlet port 12, a tub outlet port 14 and a shower outlet port 16. The housing 10 has threaded areas 18 and 20 which will be used when mounting the diverter housing within the tub/shower enclosure.

Positioned within housing 10 in the central chamber 22 thereof is a diverter valve 24 formed of a stem 26 and a sleeve 28. Both elements may be made of a suitable plastic, for example Celcon. Valve 24 is mounted within housing 10 by means of a threaded nut 30, with the diverter valve stem having a stem extension 32 which extends outwardly from the housing. The stem extension will have an operating knob mounted thereon so that a person using the tub/shower can direct water to either the tub spout or the shower head.

Stem 26 includes a pair of spaced shoulders 34 and 36 which define between them a space for an O-ring 38 which forms a seal between the exterior of the stem and the interior of nut 30, thereby preventing any water from leaking outwardly from the interior of housing 10. Nut 30, which is threadedly engaged into housing 10 has an exterior seal which abuts housing 10 to prevent any outward leakage past the nut 30 threads. The stem has an outwardly-extending stop 40 which is used to limit rotational movement of the diverter valve between a tub position and a shower position. The stem includes an inlet deflector 42 formed by a pair of oppositely-disposed slanted walls 43 terminating in a small flattened end 44 with the slanted walls being positioned to deflect or direct water through the hollow interior of sleeve 28. Directly adjacent the deflector walls 43 the stem includes a plurality of outwardly-extending hooks 46 which interact with mating spaces 48 on one end of sleeve 28 to provide a snap fit between the two elements of the diverter valve. There is a shoulder 50 on the stem directly adjacent hooks 46 which limits relative movement of the stem and sleeve when they are hooked together.

Sleeve 28 has an open end to receive the slanted wall deflectors of stem 24. Directly opposite the deflector walls, when the two parts of the diverter valve are assembled, the sleeve has a pair of inlet ports 52 which are in communication with the hollow interior 54 of the sleeve. Water flowing in from the ports 52 will be directed by the slanted walls 43 into the hollow interior and toward the sleeve discharge port 56.

The single discharge port will be moved, when the diverter valve is rotated, to face either the tub outlet 14 or the shower outlet 16. There is an outlet deflector wall 58 adjacent outlet port 56, as particularly shown in FIG. 3. The slanted deflector wall 58, which terminates generally coextensively with the bottom end of discharge port 56, will direct water flowing through the cylindrical sleeve toward the discharge port, with such direction minimizing turbulence and thus increasing velocity through the sleeve to prevent stacking.

The diverter valve is completed by a pair of drain passages 60 and 62, with drain passage 60 running diametrically across the bottom of sleeve 28 and drain passage 62 running axially up along the exterior wall of sleeve 28. When the diverter valve is in a position in which discharge port 56 is in alignment with tub outlet 14, axial drain passage 62 will face shower outlet 16 so that any water remaining within the shower conduit, after the shower is turned off, will drain through passage 62, passage 60, and housing chamber 61 to tub outlet 14.

Of importance in the invention is the fact that the diverter valve is made of two parts which are removably attached. Water codes in different parts of the United States and in some foreign countries differ substantially as to the minimum and maximum permitted water flow to a shower or tub. In order to have a diverter assembly which has universal application, it is necessary to accommodate such differing water codes. The present invention meets this requirement by providing adjustable flow in that sleeve 28 may be made with different sized interiors. The water code of a particular locale, which will determine the flow rate for the tub and shower units in that area, will determine which of several available sleeves will be used in the diverter valve assembly. Thus, a single unit can accommodate different flow rates merely by changing a portion of the diverter valve. The two units are snap fit together and the only variation between the differing sleeves will be the size of the hollow interior 54.

A common phenomenon in tub/shower combinations is what is known as "stacking" which is the condition in which water will stack up the shower conduit and discharge through the shower head when the tub outlet is being used. The present invention overcomes stacking by providing a high velocity discharge, thus eliminating the tendency to stack. Also, because the exterior of sleeve 28 has a close tolerance with the interior of housing chamber 22 in the area of the sleeve, there will be no water leakage around the sleeve from the tub outlet into the shower outlet. No rubber seal is needed at this point, as the relatively close fit between the exterior of the sleeve and the interior of the diverter housing prevents any leakage from the tub outlet to the shower outlet.

Whereas the preferred form of the invention has been shown and described herein, it should be realized that there may be many modifications, substitutions and alterations thereto.

The embodiments of the invention in which an exclusive property or privilege is claimed are defined as follows:

1. A tub/shower diverter assembly including a housing having an inlet, a shower outlet and a tub outlet, a diverter valve within said housing and including a stem and a sleeve, interlocking means for removably attaching the stem and sleeve together to provide for sleeves having different sized interiors to permit different flow rates, said stem in part extending outwardly from said housing for use in manipulating the diverter valve, a seal between said stem and housing, said sleeve having a hollow interior and inlet port means positioned for alignment with said housing inlet, said stem having an outlet port positioned for alignment with either said tub or shower outlet.

2. The tub/shower diverter assembly of claim 1 further characterized by and including a drain passage on the exterior of said sleeve connecting said shower outlet and tub outlet when said sleeve outlet port is in communication with said tub outlet.

3. The tub/shower diverter assembly of claim 2 further characterized in that said drain passage has a portion on the exterior end of said sleeve and a portion extending axially along the exterior of said sleeve.

4. The tub/shower diverter assembly of claim 1 further characterized by and including an inlet deflector in the interior of said sleeve to direct water incoming through said sleeve inlet port means axially through said hollow sleeve interior toward said sleeve outlet port.

5. The tub/shower diverter assembly of claim 4 further characterized in that said inlet deflector includes a slanted wall.

6. The tub/shower diverter assembly of claim 5 further characterized in that said inlet deflector wall is a part of said stem.

7. The tub/shower diverter assembly of claim 1 further characterized by and including an outlet deflector positioned within the hollow interior of said sleeve adjacent said sleeve outlet port, said deflector directing water flowing through said sleeve hollow interior outwardly toward said sleeve outlet port.

8. The tub/shower diverter assembly of claim 7 further characterized in that said outlet deflector includes a slanted end wall in said sleeve adjacent said sleeve outlet port.

9. The tub/shower diverter assembly of claim 1 further characterized in that the exterior of said sleeve is tightly fitted within said housing, providing an essentially leakproof seal therewith.

* * * * *